(12) United States Patent
Ishii

(10) Patent No.: US 12,223,694 B2
(45) Date of Patent: Feb. 11, 2025

(54) LEARNING DEVICE, LEARNING METHOD AND PROGRAM

(71) Applicant: NEC Corporation, Tokyo (JP)

(72) Inventor: Asuka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 621 days.

(21) Appl. No.: 17/427,257

(22) PCT Filed: Jul. 4, 2019

(86) PCT No.: PCT/JP2019/026672
§ 371 (c)(1),
(2) Date: Jul. 30, 2021

(87) PCT Pub. No.: WO2020/161935
PCT Pub. Date: Aug. 13, 2020

(65) Prior Publication Data
US 2022/0122349 A1 Apr. 21, 2022

(30) Foreign Application Priority Data

Feb. 5, 2019 (WO) .................. PCT/JP2019/004032

(51) Int. Cl.
*G06V 10/00* (2022.01)
*G06N 3/045* (2023.01)
*G06V 10/776* (2022.01)
(52) U.S. Cl.
CPC .......... *G06V 10/776* (2022.01); *G06N 3/045* (2023.01)

(58) Field of Classification Search
CPC ....... G06V 10/776; G06N 3/045; G06N 20/00
See application file for complete search history.

(56) References Cited

U.S. PATENT DOCUMENTS

| 2015/0336461 | A1* | 11/2015 | Decoster | H02J 7/1423 307/10.1 |
| 2015/0356461 | A1* | 12/2015 | Vinyals | G06N 20/00 706/12 |
| 2018/0268292 | A1* | 9/2018 | Choi | G06V 10/454 |
| 2019/0244604 | A1* | 8/2019 | Masataki | G10L 15/183 |

FOREIGN PATENT DOCUMENTS

| CN | 107977707 A | 5/2018 |
| WO | 2018051841 A1 | 3/2018 |
| WO | WO-2018062265 A1 * | 4/2018 ............. G06F 17/18 |

OTHER PUBLICATIONS

JP Office Action for JP Application No. 2020-570350, mailed on Aug. 9, 2022 with English Translation.
International Search Report for PCT Application No. PCT/JP2019/026672, mailed on Sep. 24, 2019.

(Continued)

*Primary Examiner* — Ping Y Hsieh

(57) ABSTRACT

The learning device includes: a first estimation unit configured to perform estimation using a temperature parameter, based on a student model; a second estimation unit configured to perform estimation using the temperature parameter, based on a teacher model; and a temperature calculation unit configured to calculate the temperature parameter, based on estimation information generated by the first estimation unit and the second estimation unit.

11 Claims, 7 Drawing Sheets

(56) References Cited

OTHER PUBLICATIONS

Geoffrey Hinton et al., "Distilling the Knowledge in a Neural Network", NIPS 2014 Deep Learning Workshop, submitted Mar. 9, 2015, pp. 1-5, arXiv:1503.02531.

Mosner Ladislav et al., "Improving Noise Robustness of Automatic Speech Recognition Via Parallel Data and Teacher-Student Learning", arXiv [online], Jan. 11, 2019 [retrieved on Apr. 23, 2019], Retrieved from the Internet: URL:https://arxiv.org/pdf/1801.02348v2.pdf, pp. 1-5.

* cited by examiner

LEARNING DEVICE, LEARNING METHOD AND PROGRAM

This application is a National Stage Entry of PCT/JP2019/026672 filed on Jul. 4, 2019, which claims priority from WO Patent Application PCT/JP2019/004032 filed on Feb. 5, 2019, the contents of all of which are incorporated herein by reference, in their entirety.

TECHNICAL FIELD

The present invention relates to deep learning, and more particularly to knowledge distillation.

BACKGROUND ART

There are known techniques of deep learning for learning language recognition and image recognition using a DNN (Deep Neural Network) having neurons connected in multilayers. In general, however, a DNN has a proportional relationship between a number of parameters and estimation accuracy, and a DNN operating with a small computational amount has a problem of low accuracy.

On the other hand, it is known that the estimation accuracy can be improved, even in a DNN of small calculation amount, by using a learning method called knowledge distillation (for example, Patent Document 1 and Non-Patent Document 1). In the knowledge distillation, in addition to the correct labels of the learning data, the estimation results of the DNN already learned (referred to as the "teacher model") are also used as the correct labels. Generally, as the teacher model, a DNN having more parameters and higher accuracy than the DNN to be learned from now on (called "student model") is selected. As a method of knowledge distillation, by introducing a hyperparameter T called "temperature", it becomes possible to effectively reflect the output of the teacher model to the learning of the student model.

PRECEDING TECHNICAL REFERENCES

Patent Document

Patent Document 1: U.S. Patent Publication U2015/0356461 A1

Non-Patent Document

Non-Patent Document 1: Distilling the Knowledge in a Neural Network, Geoffrey Hinton, Oriol Vinyals, Jeff Dean

SUMMARY OF INVENTION

Problem to be Solved by the Invention

However, it is known that, depending on the value of the temperature, the accuracy of the student model after learning is not much different or rather lowered compared with the case without using the knowledge distillation. Therefore, there is proposed a technique called "grid search", which compares the accuracy of student models learned with setting several different temperatures and adopts the most accurate one. However, in addition to the problem that this requires a lot of learning time, there is also a problem that the temperature which gives the highest accuracy may be omitted because a discrete value must be set. It is experimentally known that an appropriate temperature giving the highest accuracy varies depending on the structure and size of the teacher model and the student model, the type and difficulty of the problem to be solved, and other hyperparameters used for the learning. However, no technique for quantitatively evaluating or automatically obtaining an appropriate temperature has been disclosed.

It is an example object of the present invention to automatically obtain an appropriate temperature in deep learning using knowledge distillation.

Means for Solving the Problem

According to an example aspect of the present invention, there is provided a learning device comprising:
  a first estimation unit configured to perform estimation using a temperature parameter, based on a student model;
  a second estimation unit configured to perform estimation using the temperature parameter, based on a teacher model; and
  a temperature calculation unit configured to calculate the temperature parameter, based on estimation information generated by the first estimation unit and the second estimation unit.

According to another example aspect of the present invention, there is provided a learning method executed by a learning device, comprising:
  performing estimation using a temperature parameter, based on a student model;
  performing estimation using the temperature parameter, based on a teacher model; and
  calculating the temperature parameter, based on estimation information generated by the first estimation unit and the second estimation unit.

According to still another example aspect of the present invention, there is provided a program executed by a learning device including a computer, the program causing the computer to function as:
  a first estimation unit configured to perform estimation using a temperature parameter, based on a student model;
  a second estimation unit configured to perform estimation using the temperature parameter, based on a teacher model; and
  a temperature calculation unit configured to calculate the temperature parameter, based on estimation information generated by the first estimation unit and the second estimation unit.

EXAMPLE EMBODIMENTS

The preferred example embodiments of the present invention will now be described below with reference to the attached drawings.

[Device Configuration]

Figure 1:
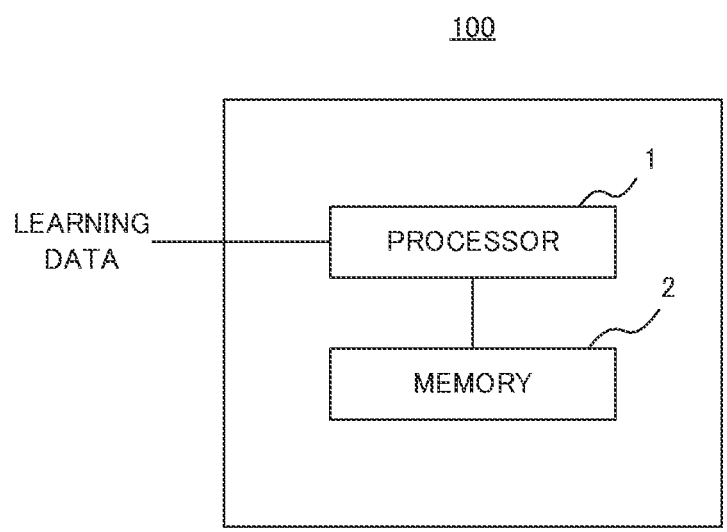
FIG. 1 is a block diagram showing a hardware configuration of a learning device according to example embodiments.

FIG. 1 is a block diagram illustrating a hardware configuration of a learning device according to example embodiments. The learning device 1 may be a computer, and includes a processor 1 and a memory 2. The learning data with correct labels are inputted to the learning device 1. The learning device 1 is a device to execute learning using knowledge distillation, and performs the learning of a student model using the learning data and a teacher model.

Specifically, the memory 2 stores the internal parameters forming the student model and the teacher model, as well as the temperature parameter used for knowledge distillation. The processor 1 performs learning by applying the learning data to the student model and the teacher model based on each parameter stored in the memory 2 and updating each parameter. Further, the processor 1 automatically updates the temperature parameter based on the information (hereinafter referred to as "estimation information") obtained by the estimation processing by the student model and the teacher model.

[Basic Configuration]

Figure 2:
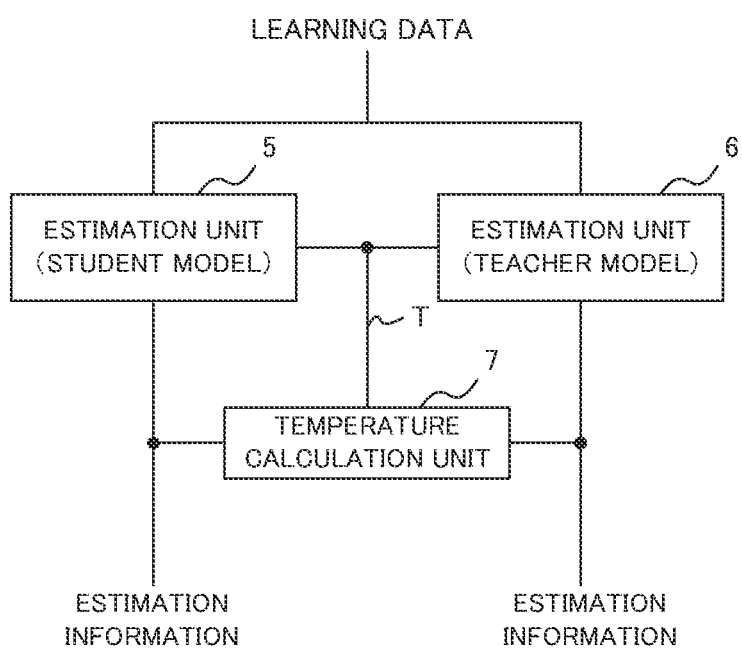
FIG. 2 is a block diagram showing a basic functional configuration of a learning device according to the example embodiments.

FIG. 2 is a block diagram illustrating a basic functional configuration of the learning device according to the example embodiments. As illustrated, the learning device 1 includes an estimation unit 5, an estimation unit 6, and a temperature calculation unit 7. The estimation unit 5 is an estimation unit forming the student model, and outputs the estimation information by performing estimation processing of the learning data using the temperature parameter T. On the other hand, the estimation unit 6 is an estimation unit forming the teacher model, and outputs the estimation information by performing the estimation processing of the learning data using the temperature parameter T. The temperature calculation unit 7 calculates the temperature parameter T based on the estimation information generated by the estimation unit 5 and the estimation information generated by the estimation unit 6, and supplies the temperature parameter T to the estimation units 5 and 6. Thus, the temperature parameter T used by the estimation units 5 and 6 are automatically updated. In an example, a logit or estimation result generated by the student model and the teacher model is used as the estimation information. In another example, as the estimation information, the loss of the estimation result of the student model with respect to the correct labels, and the loss of the estimation result of the student model with respect to the estimation result of the teacher model are used.

First Example Embodiment

Next, a description will be given of a first example embodiment. The first example embodiment updates the temperature parameter based on the loss of the estimation result generated by the student model with respect to the correct labels, and the loss of the estimation result generated by the student model with respect to the estimation result generated by the teacher model. The loss is an example of the estimation information of the present invention.

(Functional Configuration)

Figure 3:
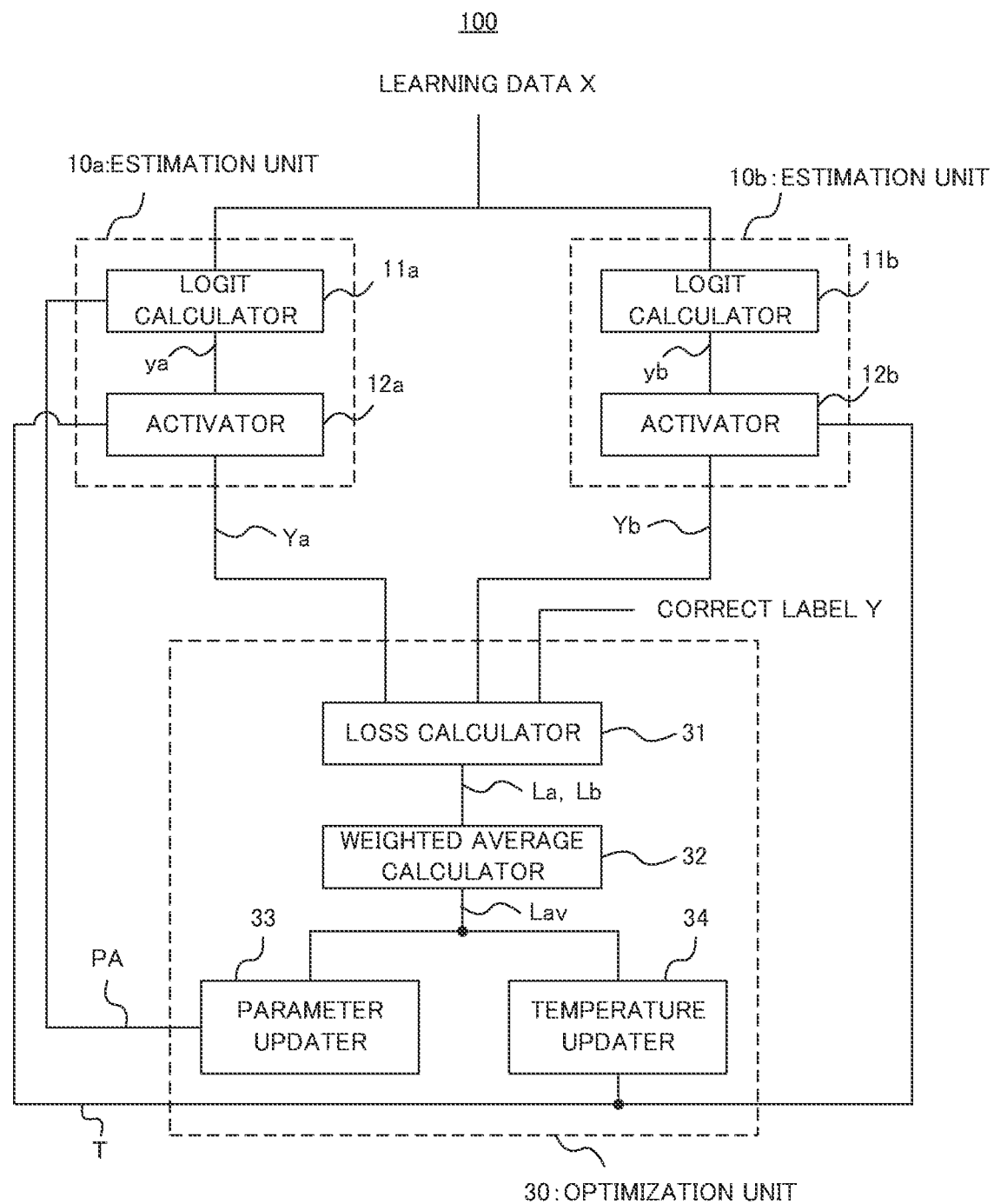
FIG. 3 is a block diagram showing a functional configuration of a learning device according to a first example embodiment.

FIG. 3 is a block diagram illustrating a functional configuration of the learning device 100 according to the first example embodiment. The learning data is inputted to the learning device 100. The learning data is a set of learning data X which shows features to be learned such as character strings and images, and its correct label Y. For example, when a DNN for determining whether an image shows a dog or a cat is learned, the learning data X is an image of a dog, and the correct label Y is a vector of binary value having "1" for the correct answer class to which the image belongs and "0" for the other incorrect answer classes, such as (Dog class 1, Cat class 0).

The learning device 100 roughly includes an estimation unit 10a, an estimation unit 10b and an optimization unit 30. The estimation unit 10a corresponds to the DNN forming the student model, and includes a logit calculator 11a and an activator 12a. The student model is the model to be learned. The estimation unit 10a outputs the estimation result Ya for the inputted learning data X. Specifically, the logit calculator 11a converts the inputted learning data X to the logit ya based on the internal parameters PA. The activator 12a converts the logit ya to the estimation result Ya, which is a probability distribution, based on a predetermined function such as a softmax function shown in Equation (1).

$$s(z_i) = \frac{\exp(z_i)}{\sum \exp(z_j)} \quad (1)$$

The activator 12a calculates the estimation result Ya using the temperature parameter T, and the details thereof will be described later. The estimation result Ya is generally a vector having a value other than "0" for the incorrect answer class, such as (Dog class 0.8, Cat class 0.2). The estimation result Ya is supplied to the optimization unit 30.

On the other hand, the estimation unit 10b corresponds to the DNN forming the teacher model, and includes a logit calculator 11b and an activator 12b. The teacher model is a model that has already been learned, and is generally a highly accurate DNN having more parameters than the student model. The estimation unit 10b outputs the estimation result Yb for the inputted learning data X. Specifically, the logit calculator 11b converts the inputted learning data X to the logit yb based on the internal parameters PB. The activator 12b converts the logit yb to the estimation result Yb, which is a probability distribution, based on a predetermined function such as a softmax function given as the above Equation (1). The activator 12b also calculates the estimation result Yb using the temperature T, and the details thereof will be described later. Similarly to the estimation result Ya, the estimation result Yb is a vector having a value other than "0" for the incorrect answer class. The estimation result Yb is supplied to the optimization unit 30.

The optimization unit 30 includes a loss calculator 31, a weighted average calculator 32, a parameter updater 33 and a temperature updater 34. The estimation result Ya generated by the estimation unit 10a, the estimation result Yb generated by the estimation unit 10b and the correct label Y of the learning data are inputted to the loss calculator 31. The loss calculator 31 calculates the loss La of the estimation result Ya with respect to the correct label Y and calculates the loss Lb of the estimation result Ya with respect to the estimation result Yb, based on a predetermined function such as the categorical cross entropy given by Equation (2). "Loss" indicates how far the estimation result Ya and the correct label Y, or the estimation result Ya and the estimation result Yb are apart.

$$C = -Y \ln(Y') \quad (2)$$

If the number of learning data is not balanced among classes, the effect of correcting the balance may be added to the losses La and Lb. Specifically, Equation (3) multiplies the loss for each class by the coefficient $w_i$ for correction. For example, the coefficient $w_i$ is calculated by Equation (4) or (5).

$$C = -\sum_i w_i * Y_i \log(Y_i') \quad (3)$$

$$w_i = 1/n_i \quad (4)$$

$$w_i = (1/n_i) \Big/ \left(\sum_j 1/n_j\right) \quad (5)$$

Here, $n_i$ is the total number of learning data belonging to the i-th class. In another example, the sum of the estimation result Yb for each class, calculated by the teacher model for all the learning data or for mini-batches, may be used as the coefficient $w_i$, instead of the total number $n_i$ of the learning data.

The weighted average calculator 32 calculates the weighted average Lav of the losses La and Lb using a predetermined weight. The parameter updater 33 updates the internal parameters PA of the logit calculator 11a so that the weighted averaged loss Lav is reduced based on a predetermined function such as a gradient descent method given by Equation (6), and supplies the updated parameters PA to the logit calculator 11a.

$$P^{(n)} = P^{(n+1)} - \epsilon \frac{\partial C}{\partial P} \quad (6)$$

Thus, the internal parameters PA of the logit calculator 11a are updated. It is noted that the internal parameters PB of the logit calculator 11b of the estimation unit 10b are not updated.

The temperature updater 34 updates the temperature parameter T to be used by the activator 12a of the estimation unit 10a and the activator 12b of the estimation unit 10b. Here, knowledge distillation process using a temperature T by the activators 12a and 12b will be described in detail. The estimation units 10a and 10b output the estimation results Ya and Yb, respectively. However, since the estimation result Yb is outputted by the learned high-accuracy teacher model, the element of the vector becomes close to the binary value, such as (Dog class 0.999, Cat class 0.001), so that the learning process is almost unchanged from the case where only the correct label Y such as (Dog class 1, Cat class 0) is used. Therefore, a hyper-parameter T called "temperature parameter" is newly introduced. The temperature parameter T is introduced into the activation function of the activator as shown in Equation (7), and generally uses T≥1.

$$s(z_i) = \frac{\exp(z_i/T)}{\sum \exp(z_j/T)} \quad (7)$$

In this way, the estimation result Yb, which is actually (Dog class 0.999, Cat class 0.001), becomes a smooth distribution like (Dog class 0.9, Cat class 0.1). Therefore, the numerical value of "Cat class 0.1" affects the learning process, making it possible to efficiently learn the student model. That is, the temperature parameter T is introduced to adjust mismatch of the digits of the correct answer class and the incorrect answer class among the correct labels outputted by the teacher model.

Similarly to the parameter updater 33 optimizing the internal parameters PA of the student model using the losses, the temperature updater 34 sequentially optimizes the temperature parameter T using the losses. Specifically, the temperature updater 34 updates the temperature parameter T so that the weighted averaged loss Lay is reduced. For example, the temperature updater 34 may update the temperature parameter T by Equation (8).

$$T^{(n+1)} = T^{(n)} - \epsilon \frac{\partial C}{\partial T} \quad (8)$$

In Equation (8), "$\epsilon$" is a constant that performs the same function as the learning rate "$\epsilon$" in Equation (6). For "$\epsilon$", the same value may be used during learning, or the value may be changed according to the progress of learning as in the plateau. Further, for "$\epsilon$", the same value as in Equation (6) may be used, or a different value may be used. While Equation (8) shows a general gradient descent method, regularization techniques such as weight decay or weight upper bound may be used together, as in the case of the internal parameters P of the model. Further, the optimization method that the temperature updater 34 uses to update the temperature parameter T is not limited to the gradient descent method of Equation (8), and other optimization methods such as momentum, adagrad, adadelta or adam may be used.

Thus, the optimizing unit 30 repeats the update of the internal parameters PA of the estimation unit 10a and the temperature parameter T, until the update amount becomes sufficiently small. When the update amount becomes smaller than the predetermined value, the learning ends. When the student model after learning is used for inference, the temperature parameter T is set as T=1. In other words, the temperature parameter T is set as T≥1 at the time of learning and T=1 at the time of inference.

(Processing Flow)

Figure 4:
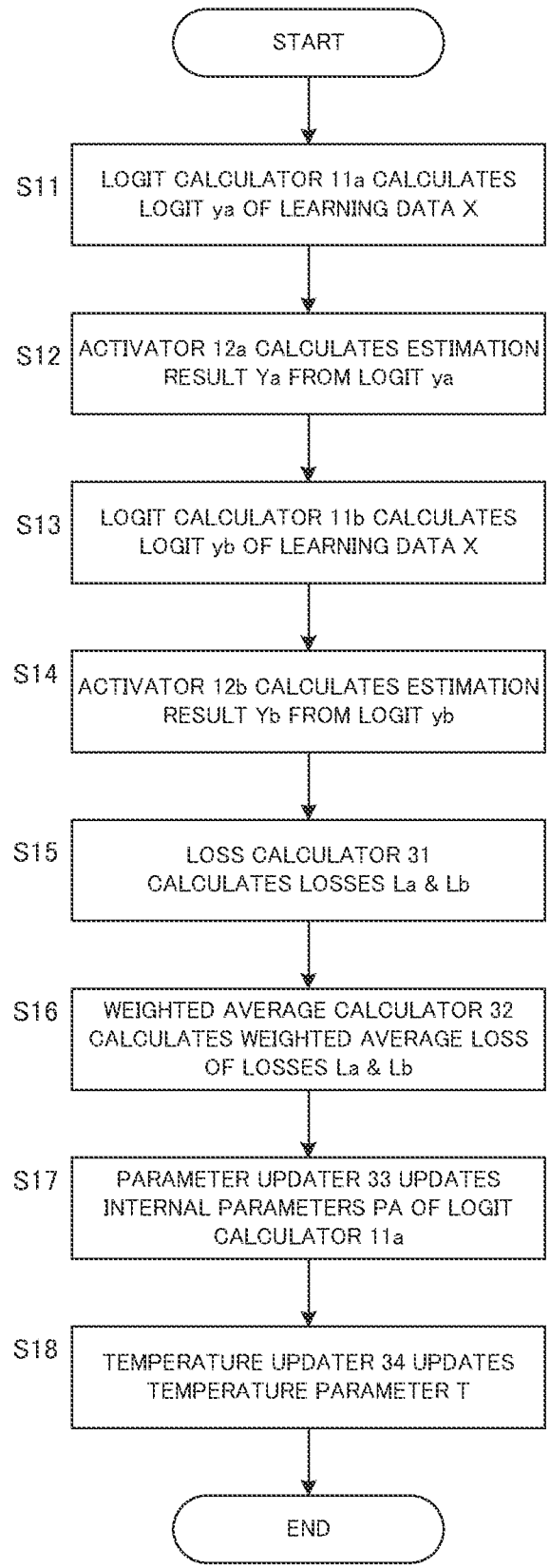
FIG. 4 is a flowchart of a learning process according to the first example embodiment.

Next, the flow of the learning process according to the first example embodiment will be described. FIG. 4 is a flowchart of the learning processing according to the first example embodiment. This process is realized by the processor 1 shown in FIG. 1, which executes a program prepared in advance.

When the learning data X is inputted to the learning device 100, in the estimation unit 10a corresponding to the student model, the logit calculator 11a calculates the logit ya of the learning data X (step S11). Next, the activator 12a calculates the estimation result Ya from the logit ya using the temperature parameter T as described above (step S12). Similarly, in the estimation unit 10b corresponding to the teacher model, the logit calculator 11b calculates the logit yb of the learning data X (step S13). Next, the activator 12b calculates the estimation result Yb from the logit yb using the temperature parameter T as described above (step S14).

Next, in the optimizing unit 30, the loss calculator 31 calculates the loss La of the estimation result Ya with respect to the correct label Y, and the loss Lb of the estimation result Ya with respect to the estimation result Yb (step S15). Next, the weighted average calculator 32 calculates the weighted average Lay of the losses La and Lb (step S16).

Next, the parameter updater 33 updates the internal parameters PA of the logit calculator 11a based on the weighted averaged loss Lay (step S17). Next, the temperature updater 34 updates the temperature parameter T used by the activators 12a and 12b based on the weighted averaged loss Lay (step S18).

The learning device 100 repeats the above processing until the update amount of the internal parameters PA by the parameter updater 33 becomes smaller than the predetermined value, and ends the processing when the update amount becomes smaller than the predetermined value. The student model is defined by the internal parameters PA set in the logit calculator 11a and the temperature parameter T set in the activator 12a when the processing ends. Then, at the time of inference, the inference processing is executed by the student model in which the temperature parameter T is set as T=1.

(Modification)

In the above-described first example embodiment, the temperature updater 34 updates the temperature parameter T using both the loss La of the estimation result Ya with respect to the correct label Y and the loss Lb of the estimation result Ya with respect to the estimation result Yb. Instead, the temperature updater 34 may update the temperature parameter T using one of the loss La of the estimation result Ya with respect to the correct label Y and the loss Lb of the estimation result Ya with respect to the estimation result Yb.

Example

In one example of the first example embodiment, the initial value of the temperature parameter T is set to "1". The temperature updater 34 updates the temperature parameter T at the same timing as the parameter updater 33 updates the internal parameters PA of the logit calculator 11a. The temperature updater 34 updates the temperature parameter T using the stochastic gradient descent method, and the learning rate is set as: $\varepsilon=1.0\times10^{-4}$.

The above process is repeated for one sample or a set of multiple samples (referred to as a "mini-batch") of similar learning data. The repetition is ended when the update amount of the temperature parameter T or the update amount of the internal parameters PA of the logit calculator 11a becomes sufficiently small, or the number of repetition reaches a predetermined number of repetitions (e.g., 100 times). Thereafter, a similar process is executed for a sample or mini-batch of another learning data, and the process is repeated until the update amount of the internal parameters PA of the logit calculator 11a becomes sufficiently small. At this time, the initial value of the temperature parameter T is set to "1" every time the sample or the mini-batch is changed.

Second Example Embodiment

Next, a description will be given of a second example embodiment. The second example embodiment updates the temperature parameter based on the logits calculated by the logit calculators in the estimation units. The logit is an example of the estimation information of the present invention. The hardware configuration of the learning device 200 according to the second example embodiment is the same as that of the learning device 100 according to the first example embodiment shown in FIG. 1.

(Functional Configuration)

Figure 5:
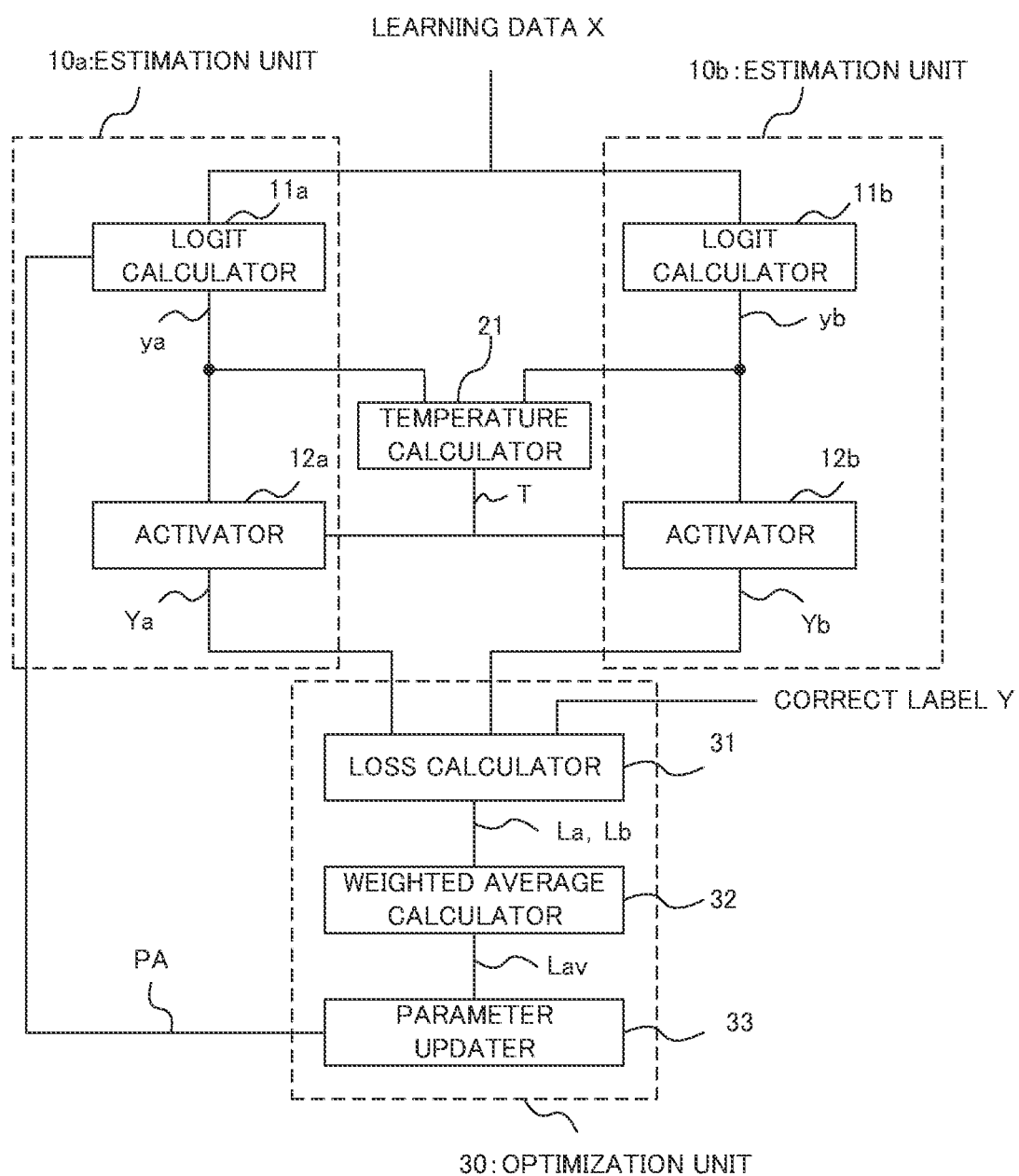
FIG. 5 is a block diagram showing a functional configuration of a learning device according to a second example embodiment.

FIG. 5 is a block diagram illustrating a functional configuration of the learning device 200 according to the second example embodiment. As can be seen in comparison with FIG. 3, the learning device 200 has the same basic configuration as the learning device 100 according to the first example embodiment, and includes the estimation unit 10a, the estimation unit 10b and the optimization unit 30. However, the learning device 200 according to the second example embodiment includes a temperature calculator 21 instead of the temperature updater 34 according to the first example embodiment.

To the temperature calculator 21, the logit ya outputted by the logit calculator 11a of the estimation unit 10a and the logit yb outputted by the logit calculator 11b of the estimation unit 10b are inputted. The temperature calculator 21 calculates an appropriate temperature parameter T using the logits ya and yb based on a predetermined function. As described above, the temperature parameter T has been introduced to adjust the mismatch of the digits of the correct answer class and the incorrect answer class among the correct labels outputted by the teacher model. Since the intensity of the mismatch varies with the learning data, the temperature parameter T is changed accordingly. Specifically, the temperature calculator 21 sets a large value to the temperature parameter T when the mismatch of the logits ya and yb is large, and sets a value close to "1" to the temperature parameter T when the mismatch is small. This makes it possible to learn any learning data equally.

The temperature calculator 21 supplies the calculated temperature parameter T to the activators 12a and 12b. The activator 12a calculates the estimation result Ya based on the logit ya inputted from the logit calculator 11a and the temperature parameter T, and supplies the estimation result Ya to the loss calculator 31 of the optimization unit 30. Also, the activator 12b calculates the estimation result Yb based on the logit yb inputted from the logit calculator 11b and the temperature parameter T, and supplies the estimation result Yb to the loss calculator 31 of the optimization unit 30.

In the optimization unit 30, the loss calculator 31 calculates the loss La of the inputted estimation result Ya with respect to the correct labels and the loss Lb of the estimation result Ya with respect to the estimation result Yb, and the weighted average calculator 32 calculates the weighted average loss Lav of the losses La and Lb. Then, the parameter updater 33 updates the internal parameters PA of the logit calculator 11a in the estimation unit 10a based on the weighted averaged loss Lay.

If the number of learning data is not balanced among classes, the effect of correcting the balances may be added to the losses La and Lb. Specifically, Equation (3) multiplies the loss for each class by the coefficient $w_i$ for correction. For example, the coefficient $w_i$ is calculated by Equation (4) or (5) described above. Here, $n_i$ is the total number of learning data belonging to the i-th class. In another example, the sum of the estimation result Yb for each class, calculated by the teacher model for all the learning data or for mini-batches, may be used as the coefficient $w_i$, instead of the total number $n_i$ of the learning data.

(Processing Flow)

Figure 6:
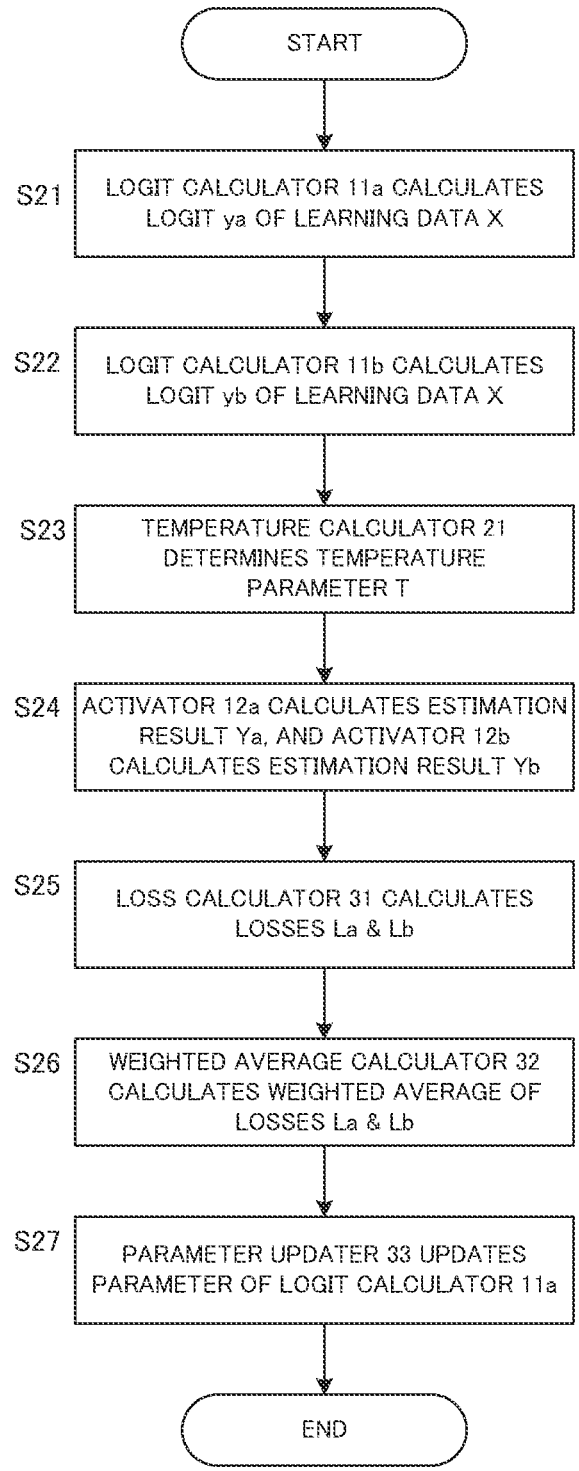
FIG. 6 is a flowchart of a learning process according to the second example embodiment.

Next, the flow of the learning process according to the second example embodiment will be described. FIG. 6 is a flowchart of the learning process according to a second example embodiment. This process is realized by the processor 1 shown in FIG. 1, which executes a program prepared in advance.

When the learning data X is inputted to the learning device 200, in the estimation unit 10a corresponding to the student model, the logit calculator 11a calculates the logit ya of the learning data X (step S21). In the estimation unit 10b corresponding to the teacher model, the logit calculator 11b calculates the logit yb of the learning data X (step S22). Next, the temperature calculator 21 determines the temperature parameter T from the logits ya and yb based on a predetermined function (step S23). The determined temperature parameter T is supplied to the activators 12a and 12b.

Next, the activator 12a calculates the estimation result Ya from the logit ya using the temperature parameter T, and the activator 12b calculates the estimation result Yb from the logit yb using the temperature parameter T (step S24).

Next, in the optimizing unit 30, the loss calculator 31 calculates the loss La of the estimation result Ya with respect to the correct labels Y, and the loss Lb of the estimation result Ya with respect to the estimation result Yb (step S25). Next, the weighted average calculator 32 calculates the weighted average Lay of the loss La and the loss Lb (step S26). Next, the parameter updater 33 updates the internal parameters PA of the logit calculator 11a based on the weighted averaged loss Lay (step S27).

The learning device 200 repeats the above-described processing until the update amount of the internal parameters PA by the parameter updater 33 becomes smaller than the predetermined value, and ends the processing when the update amount becomes smaller than the predetermined value. The student model is defined by the internal parameters PA set in the logit calculator 11a and the temperature parameter T set in the activator 12a when the processing ends. Then, at the time of inference, the inference process is executed by the student model in which the temperature parameter is set as: T=1.

(Modification)

In the second example embodiment described above, the temperature calculator 21 calculates the temperature parameter T using both the logit ya generated by the estimation unit 10a corresponding to the student model and the logit yb generated by the estimation unit 10b corresponding to the teacher model. Instead, the temperature calculator 21 may calculate the temperature parameter T using one of the logit ya generated by the estimation unit 10a corresponding to the student model and the logit yb generated by the estimation unit 10b corresponding to the teacher model.

Example

In one example of the second example embodiment, the temperature parameter T is set to a positive value when the value of the logit outputted by the estimation unit 10a corresponding to the student model or the estimation unit 10b corresponding to the teacher model is positive, and is set to a negative value when the value of the logit outputted by the estimation unit 10a corresponding to the student model or the estimation unit 10b corresponding to the teacher model is negative. For example, if the value of the logit is negative, the temperature parameter T is set as T=−5, and if the value of the logit is positive, the temperature parameter T is set as T=1. Preferably, the temperature parameter T is determined in the range from −100 to 100. For example, the temperature calculator 21 sets the temperature parameter T to a value from 0 to 100 when the logit outputted by the estimation unit 10a corresponding to the student model is positive, and sets the temperature parameter T to a value from −100 to 0 when the logit is negative. A sigmoid function is used for the activation function of the activators 12a and 12b.

Third Example Embodiment

Next, a description will be given of a third example embodiment. The third example embodiment updates the temperature parameter based on the estimation result calculated by the estimation unit. The estimation result is an example of the estimation information of the present invention. The hardware configuration of the learning device 300 according to the third example embodiment is the same as that of the learning device 100 according to the first example embodiment shown in FIG. 1.

(Functional Configuration)

Figure 7:
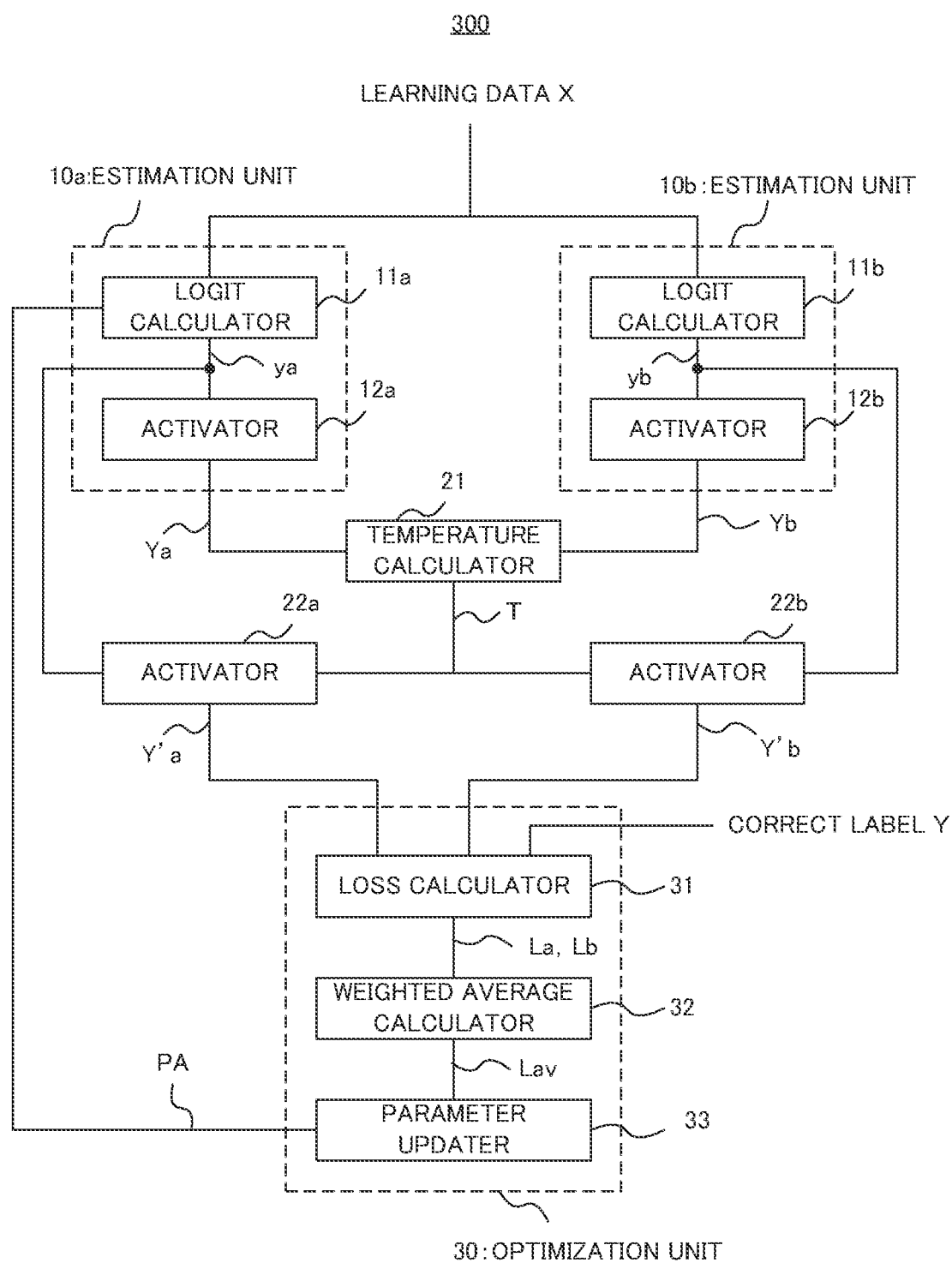
FIG. 7 is a block diagram showing a functional configuration of a learning device according to a third example embodiment.

FIG. 7 is a block diagram illustrating a functional configuration of the learning device 300 according to the third example embodiment. As can be seen in comparison with FIG. 5, the learning device 300 includes activators 22a and 22b in addition to the learning device 200 according to the second example embodiment. The configuration of the estimation units 10a and 10b and the optimization unit 30 is the same as that of the learning device 200 according to the second example embodiment.

The temperature calculator 21 calculates the temperature parameter T from the estimation results Ya and Yb supplied from the estimation units 10a and 10b based on a predetermined function, and supplies the temperature parameter T to the activators 22a and 22b. The activator 22a calculates the estimation result Y'a from the logit ya outputted by the logit calculator 11a based on a predetermined function and the temperature parameter T, and supplies the estimation result Y'a to the loss calculator 31 of the optimization unit 30. Similarly, the activator 22b calculates the estimation result Y'b from the logit yb outputted by the logit calculator 11b based on a predetermined function and the temperature parameter T, and supplies the estimation result Y'b to the loss calculator 31 of the optimization unit 30.

The configuration of the optimizing unit 30 is the same as the second example embodiment. Namely, the loss calculator 31 calculates the loss La of the estimation result Y a with respect to the correct labels Y and the loss Lb of the estimation result Y'a with respect to the estimation result Y'b, and the weighted average calculator 32 calculates the weighted average loss Lab of the losses La and Lb. Then, the parameter updater 33 updates the internal parameters PA of the logit calculator 11a in the estimation unit 10a based on the weighted averaged loss Lay.

If the number of learning data is not balanced among classes, the effect of correcting the balances may be added to the losses La and Lb. Specifically, Equation (3) described above multiplies the loss for each class by the coefficient $w_i$ for correction. For example, the coefficient $w_i$ is calculated by Equation (4) or (5) described above. Here, $n_i$ is the total number of learning data belonging to the i-th class. In another example, the sum of the estimation result Yb for each class, calculated by the teacher model for all the learning data or for mini-batches, may be used as the coefficient $w_i$, instead of the total number $n_i$ of the learning data.

(Processing Flow)

Figure 8:
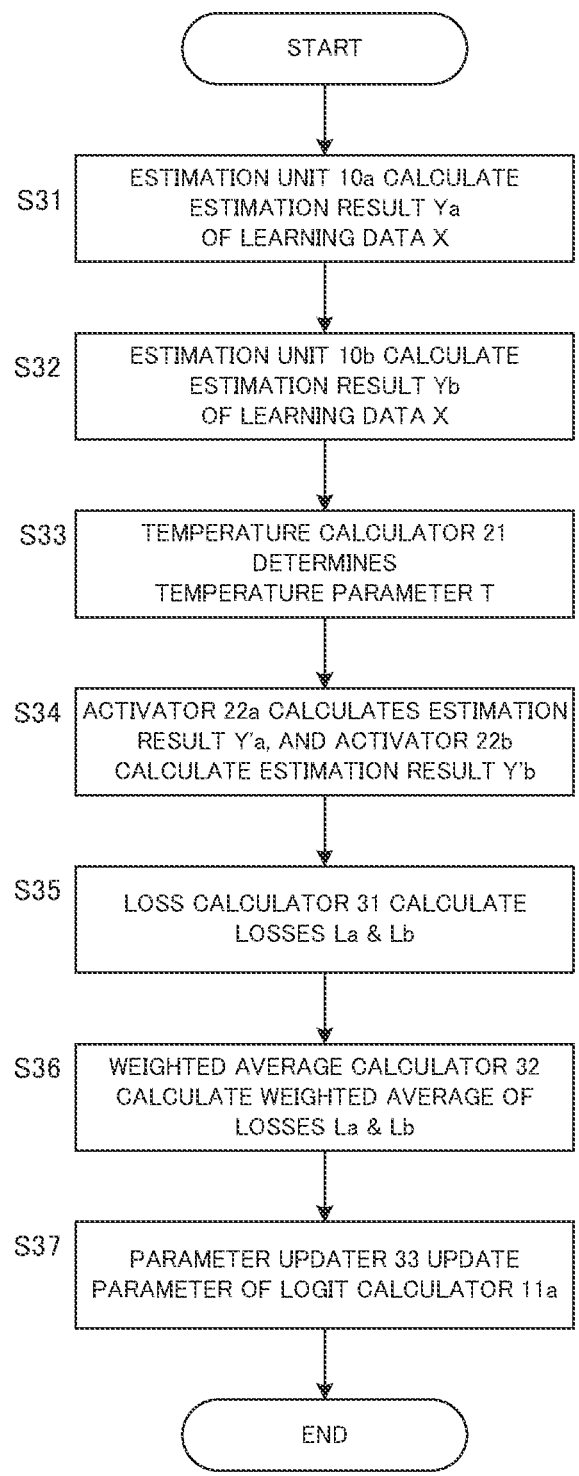
FIG. 8 is a flowchart of a learning process according to the third example embodiment.

Next, the flow of the learning process according to the third example embodiment will be described. FIG. 8 is a flowchart of learning processing according to the third example embodiment. This process is realized by the processor 1 shown in FIG. 1, which executes a program prepared in advance.

When the learning data X is inputted to the learning device 300, the estimation unit 10a corresponding to the student model calculates the estimation result Ya from the learning data X (step S31). When calculating the estimation result Ya, the activator 12a of the estimation unit 10a uses the temperature parameter T=1. The estimation unit 10b corresponding to the teacher model calculates the estimation result Yb from the learning data X (step S32). When calculating the estimation result Yb, the activator 12b of the estimation unit 10b uses the temperature parameter T=1.

Next, the temperature calculator 21 determines the temperature parameter T from the estimation results Ya and Yb based on a predetermined function (step S33). The determined temperature parameter T is supplied to the activators 22a and 22b.

Next, the activator 22a calculates the estimation result Y'a from the logit ya outputted by the logit calculator 11a using the temperature parameter T. Also, the activator 22b calculates the estimation result Y'b from the logit yb outputted by the logit calculator 11b using the temperature parameter T (step S34).

Next, in the optimizing unit 30, the loss calculator 31 calculates the loss La of the estimation result Y'a with respect to the correct labels Y and the loss Lb of the estimation result Y'a with respect to the estimation result Y'b (step S35). Next, the weighted average calculator 32 calculates the weighted average Lav of the loss La and the loss Lb (step S36). Then, the parameter updater 33 updates the internal parameters PA of the logit calculator 11a based on the weighted averaged loss Lav (step S37).

The learning device 300 repeats the above-described processing until the update amount of the internal parameters PA by the parameter updater 33 becomes smaller than the predetermined value, and ends the processing when the update amount becomes smaller than the predetermined value. The student model is defined by the internal parameters PA set in the logit calculator 11a and the temperature parameter T set in the activator 22a when the processing ends. Then, at the time of inference, the inference processing is executed by the student model in which the temperature parameter T is set as T=1.

(Modification)

In the third example embodiment described above, the temperature calculator 21 calculates the temperature parameter T using both the estimation result Ya generated by the estimation unit 10a corresponding to the student model and the estimation result Yb generated by the estimation unit 10b corresponding to the teacher model. Instead, the temperature calculator 21 may calculate the temperature parameter T using one of the estimation result Ya generated by the estimation unit 10a corresponding to the student model and the estimation result Yb generated by the estimation unit 10b corresponding to the teacher model.

Examples

In a first example of the third example embodiment, the temperature calculator 21 sets the temperature parameter T so as to correct the magnitude balance of the probability estimate value of each class of the estimation result Yb outputted from the estimation unit 10b, specifically, such that the order of the estimation result of each class is balanced. For example, the temperature calculator 21 sets the temperature parameter T as T=5 in the case where the maximum value/minimum value of the probability estimate is equal to or greater than $10^5$, and sets the temperature parameter T as T=1 in other cases. Preferably, the temperature parameter T is determined in the range from 1 to 100. The softmax function is used for the activation function of the activators 22a and 22b.

In a second example of the third example embodiment, supposing that the value of the highest probability class is "p1" and the value of the second highest probability class is "p2" among the estimation results Yb outputted from the estimation unit 10b corresponding to the teacher model, the temperature calculator 21 determines the temperature parameter T based on the ratio of those values: r=p1/p2. In an example, the temperature calculator 21 sets T=1 when r<4, sets T=2 when 4≤r<5, and sets T=3 when r≥5. In another example, the temperature calculator 21 determines the temperature parameter T by a sigmoid function more continuously related to "r". For example, the temperature calculator 21 sets the temperature parameter T as T=1 when "r" is sufficiently small, T=3 when "r" is sufficiently large, and T=2 when r=4, by the following Equation $$T=2/(1+e^{(-r+4)})+1$$

In a third example of the third example embodiment, the temperature parameter T is determined based on the entropy E of the estimation result Yb outputted from the estimation unit 10b corresponding to the teacher model. The entropy E is given by the following Equation (9), if the estimation result of the i-th class is expressed as $Yb_i$.

$$E = -\sum_i Yb_i * \log(Yb_i) \qquad (9)$$

The temperature parameter T is given as a monotonously decreasing function with respect to the entropy E of the estimation result Yb. In one example, the temperature parameter T is defined by Equation (10) such that T=10 when E is the minimum value and T=1 when E is the maximum value. Here, N is the number of classes that the teacher model classifies.

$$T=-9/\log(N)*E+10 \qquad (10)$$

Other Example Embodiments

The first example embodiment described above may be combined with the second example embodiment or the third example embodiment. For example, when the first example embodiment and the second example embodiment are combined, the initial value of the temperature parameter T may be determined based on the logit according to the method of the second example embodiment, and then the temperature parameter T may be updated based on the loss according to the method of the first example embodiment. Also, when the first example embodiment and the third example embodiment are combined, the initial value of the temperature parameter T may be determined based on the estimation result according to the method of the third example embodiment, and then the temperature parameter T may be updated based on the loss according to the method of the first example embodiment.

A part or all of the example embodiments described above may also be described as the following supplementary notes, but not limited thereto.

(Supplementary Note 1)
A learning device comprising:
a first estimation unit configured to perform estimation using a temperature parameter, based on a student model;
a second estimation unit configured to perform estimation using the temperature parameter, based on a teacher model; and
a temperature calculation unit configured to calculate the temperature parameter, based on estimation information generated by the first estimation unit and the second estimation unit.

(Supplementary Note 2)
The learning device according to supplementary note 1, wherein the temperature calculation unit calculates the temperature parameter based on at least one of a loss of a first estimation result generated by the first estimation unit with respect to a correct label and a loss of the first estimation result with respect to a second estimation result generated by the second estimation unit.

(Supplementary Note 3)
The learning device according to supplementary note 1, wherein the temperature calculation unit calculates the temperature parameter based on a weighted average of a loss of a first estimation result generated by the first estimation unit with respect to a correct label and a loss of the first estimation result with respect to a second estimation result generated by the second estimation unit.

(Supplementary Note 4)
The learning apparatus according to supplementary note 1, wherein the temperature calculation unit calculates the temperature parameter based on at least one of a logit generated by the first estimation unit and a logit generated by the second estimation unit.

(Supplementary Note 5)
The learning apparatus according to supplementary note 1, wherein the temperature calculation unit calculates the temperature parameter in accordance with positive and negative logits generated by the first estimation unit or the second estimation unit.

(Supplementary Note 6)
The learning apparatus according to supplementary note 1, wherein the temperature calculation unit calculates the temperature parameter based on at least one of an estimation result generated by the first estimation unit and an estimation result generated by the second estimation unit.

(Supplementary Note 7)
The learning apparatus according to supplementary note 6, wherein the temperature calculation unit calculates the temperature parameter based on entropy of an estimation result generated by the second estimation unit.

(Supplementary Note 8)
The learning apparatus according to supplementary note 6, wherein the temperature calculation unit calculates the temperature parameter as a monotonously decreasing function relating to entropy of an estimation result generated by the second estimation unit.

(Supplementary Note 9)
The learning apparatus according to supplementary note 6, wherein the temperature calculation unit calculates the temperature parameter such that magnitude balance of the estimation result of each class generated by the first estimation unit or the second estimation unit is corrected.

(Supplementary Note 10)
The learning apparatus according to supplementary note 6, wherein the temperature calculation unit calculates the temperature parameter such that the order of the estimation result of each class generated by the first estimation unit or the second estimation unit is balanced.

(Supplementary Note 11)
The learning apparatus according to supplementary note 6, wherein the temperature calculation unit calculates the temperature parameter based on a ratio of a value of a highest probability class and a second highest probability class among the estimation result of each class generated by the second estimation unit.

(Supplementary Note 12)
A learning method executed by a learning device, comprising:
performing estimation using a temperature parameter, based on a student model;
performing estimation using the temperature parameter, based on a teacher model; and
calculating the temperature parameter, based on estimation information generated by the first estimation unit and the second estimation unit.

(Supplementary Note 13)
A program executed by a learning device including a computer, the program causing the computer to function as:
a first estimation unit configured to perform estimation using a temperature parameter, based on a student model;
a second estimation unit configured to perform estimation using the temperature parameter, based on a teacher model; and
a temperature calculation unit configured to calculate the temperature parameter, based on estimation information generated by the first estimation unit and the second estimation unit.

While the invention has been particularly shown and described with reference to example embodiments and examples thereof, the invention is not limited to these example embodiments and examples. It will be understood by those of ordinary skill in the art that various changes in form and details may be made therein without departing from the spirit and scope of the present invention as defined by the claims.

DESCRIPTION OF SYMBOLS

1 Processor
2 Memory
5, 6, 10a, 10b Estimation unit
7, 21 Temperature calculator
11a, 11b Logit calculator
12a, 12b, 22a, 22b Activator
30 Optimization unit
31 Loss calculator
32 Weighted average calculator
33 Parameter updater
34 Temperature updater

The invention claimed is:
1. A learning device comprising a processor configured to:
perform first estimation using a temperature parameter, based on a student model;
perform second estimation using the temperature parameter, based on a teacher model; and
calculate the temperature parameter, based on estimation information generated by the first estimation and the second estimation, such that a magnitude balance of each of a plurality of classes of an estimation result generated by the second estimation is corrected or such that an order of the plurality of classes of the estimation result generated by the second estimation is balanced.

2. The learning device according to claim 1, wherein the processor calculates the temperature parameter based further on at least one of a loss of an estimation result generated by the first estimation with respect to correct labels and a loss of the estimation result generated by the first estimation with respect to the estimation result generated by the second estimation.

3. The learning device according to claim 1, wherein the processor calculates the temperature parameter based further on a weighted average of a loss of an estimation result generated by the first estimation with respect to correct labels and a loss of the estimation result generated by the first estimation with respect to the estimation result generated by the second estimation.

4. The learning device according to claim 1, wherein the processor calculates the temperature parameter based further on at least one of a logit generated by the first estimation and a logit generated by the second estimation.

5. The learning device according to claim 1, wherein the processor calculates the temperature parameter in accordance with positive and negative logits generated by the first estimation or the second estimation.

6. The learning device according to claim 1, wherein the processor calculates the temperature parameter based further on an estimation result generated by the first estimation.

7. The learning device according to claim 1, wherein the processor calculates the temperature parameter based further on entropy of the estimation result generated by the second estimation.

8. The learning device according to claim 1, wherein the processor calculates the temperature parameter as a monotonously decreasing function relating to entropy of the estimation result generated by the second estimation.

9. The learning device according to claim 1, wherein the processor calculates the temperature parameter based further on a ratio of a value of a highest probability class and a second highest probability class among the plurality of classes of the estimation result generated by the second estimation.

10. A learning method executed by a learning device, comprising:
    performing first estimation using a temperature parameter, based on a student model;
    performing second estimation using the temperature parameter, based on a teacher model; and
    calculating the temperature parameter, based on estimation information generated by the first estimation and the second estimation, such that a magnitude balance of each of a plurality of classes of an estimation result generated by the second estimation is corrected or such that an order of the plurality of classes of the estimation result generated by the second estimation is balanced.

11. A non-transitory computer-readable storage medium storing a program executed by a computer, the program causing the computer to:
    perform first estimation using a temperature parameter, based on a student model;
    perform second estimation using the temperature parameter, based on a teacher model; and
    calculate the temperature parameter, based on estimation information generated by the first estimation and the second estimation, such that a magnitude balance of each of a plurality of classes of an estimation result generated by the second estimation is corrected or such that an order of the plurality of classes of the estimation result generated by the second estimation is balanced.

* * * * *